United States Patent [19]

Ohba et al.

[11] Patent Number: 4,971,831

[45] Date of Patent: Nov. 20, 1990

[54] NOVEL RADIATION-CURABLE ORGANOPOLYSILOXANE COMPOUND AND COATING METHOD

[75] Inventors: Toshio Ohba; Shinji Irifune, both of Annaka, Japan

[73] Assignee: Shin-Etsu Chemical Co., Ltd., Tokyo, Japan

[21] Appl. No.: 508,078

[22] Filed: Apr. 10, 1990

[30] Foreign Application Priority Data

Apr. 19, 1989 [JP] Japan .................................. 1-99811

[51] Int. Cl.$^5$ ............................................... B05B 3/06
[52] U.S. Cl. ........................................ 427/44; 427/36; 427/54.1; 427/208.8; 556/434
[58] Field of Search ............... 427/44, 208.8, 36, 54.1; 556/434

Primary Examiner—Bernard Pianalto
Attorney, Agent, or Firm—Wyatt, Gerber, Burke and Badie

[57] ABSTRACT

A novel organopolysiloxane compound is proposed which has, in a molecule, at least three (meth)acryloxy groups localized at only one of the molecular chain ends of the polysiloxane chain. By virtue of the localization of the (meth)acryloxy groups, the organopolysiloxane compound is highly curable by the irradiation with a radiation, e.g., electron beams and ultraviolet light, to give a cured coating film on a substrate surface exhibiting excellent releasability against sticky substances. A synthetic route for the preparation of such a one-end crosslinkable organopolysiloxane compound is described.

9 Claims, No Drawings

NOVEL RADIATION-CURABLE ORGANOPOLYSILOXANE COMPOUND AND COATING METHOD

BACKGROUND OF THE INVENTION

The present invention relates to a novel radiation curable or crosslinkable organopolysiloxane compound or, more particularly, to a novel radiation-curable or crosslinkable organopolysiloxane compound which is suitable to form a cured surface film on a substrate surface having releasability against adhesives or sticky substances and useful as a back-surface treatment agent of pressure-sensitive adhesive tapes or surface treatment agent of release paper for pressure-sensitive adhesive labels and the like, hereinafter referred to as a surface-releasing agent, as well as to a method for the preparation of such a novel organopolysiloxane compound.

The invention also relates to a method for forming a surface-releasing film on the surface of a substrate by using the organopolysiloxane compound.

It is well known that a variety of organopolysiloxanes or compositions thereof are used in the application as a surface-releasing agent, of which organopolysiloxanes having two or more of (meth)acryloxy, i.e. acryloxy or methacryloxy, groups in a molecule are widely used as a radiationcurable surface-releasing agent by virtue of their crosslinkability by the irradiation with electron beams.

Such a (meth)acryloxy-containing organopolysiloxane has a problem that the surface-releasability against adhesive materials is necessarily decreased when the density of the (meth)acryloxy groups therein is increased with an object to obtain improved radiation-crosslinkability. This disadvantage can be partly overcome by admixing the (meth)acryloxycontaining organopolysiloxane with a dimethylpolysiloxane of a straightly linear molecular structure having a high molecular weight but no radiation-crosslinkability (see, for example, Japanese Patent Kokai No. 62-30234). Though not ineffective in improving the surface releasability, such an organopolysiloxane composition has a problem that the coating film produced by the electron beam irradiation of low dose is poor in respect of the residual adhesiveness. Alternatively, a proposal has been made in Japanese Patent Kokai No. 62-11914 for the use of an organopolysiloxane having (meth)acryloxy groups bonded only to the silicon atoms at the molecular chain ends as a coating agent of optical fibers. Such an organopolysiloxane, however, is not quite satisfactory as a surface-releasing agent due to the relatively poor releasability characteristics when a coating film thereof is cured by the irradiation with radiations.

SUMMARY OF THE INVENTION

The present invention accordingly has an object to provide a novel organopolysiloxane which is radiation-curable to give a surface-releasing coating film having a good balance between the radiation-crosslinkability and the surface-releasing characteristics without the above described problems and disadvantages in the prior art organopolysiloxanes or compositions thereof.

Thus, the organopolysiloxane compound unexpectedly discovered in the course of the investigations conducted with the above mentioned object is a novel compound represented by the general formula

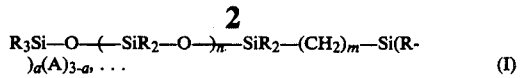

in which each R is, independently from the others, a monovalent hydrocarbon group, A is a group having at least one (meth)acryloxy group of the formula $H_2C=CR^1-CO-O-$, $R^1$ being a hydrogen atom or a methyl group, the subscript is a positive integer in the range from 4 to 101, the subscript m is a positive integer in the range from 1 to 5 and the subscript a is zero, 1 or 2, the total number of the (meth)acryloxy groups in the $(3-a)$ groups denoted by A being at least three. Namely, the organopolysiloxane, which is a novel compound not known in the prior art nor described in any literatures, is characteristic in the feature that each molecule thereof has at least three (meth)acryloxy groups localized as bonded to the silicon atom at only one of the molecular chain ends.

The method of the invention for forming a surface-releasing film on the surface of a substrate comprises: (a) coating the substrate surface with the above defined organopolysiloxane to form a coating film; and (b) irradiating the coating film with radiation such as electron beams and ultraviolet light to cure the organopolysiloxane.

DETAILED DESCRIPTION OF THE PREFERRED EMBODIMENTS

As is described above, the organopolysiloxane compound of the present invention is characteristic by the feature that each molecule thereof has at least three (meth)acryloxy groups localized as bonded to the silicon atom at only one of the molecular chain ends. As a consequence of the thus localized distribution of the (meth)acryloxy groups in the molecule, the organopolysiloxane is highly crosslinkable and cured by the irradiation with a relatively small dose of radiation or, in particular, electron beams and the cured coating film has excellent surface releasability despite the high sensitivity to radiation-induced crosslinking. This is in great contrast to conventional (meth)acryloxy group-containing organopolysiloxanes in which the (meth)acryloxy groups are distributed at random as the pendant groups on the polysiloxane structure or bonded to both of the terminal silicon atoms to have a disadvantage that simultaneous improvements can hardly be obtained in both of the radiation-curability of the compound and the surface-releasability of the radiation cured coating film.

As is mentioned above, the organopolysiloxane of the invention must have at least three (meth)acryloxy groups bonded to only one of the terminal silicon atoms in the molecular chain of the organopolysiloxane. When the total number of the (meth)acryloxy groups is smaller than 3, the organopolysiloxane would have somewhat decreased radiation-curability even when they are bonded to only one of the terminal silicon atoms.

The organopolysiloxane compound of the invention is represented by the general formula

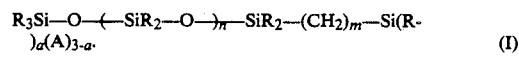

In the formula, each R is, independently from the others, a monovalent hydrocarbon group free from aliphatic unsaturation selected from the class consisting of alkyl groups, e.g., methyl, ethyl, propyl and butyl groups, and aryl groups, e.g., phenyl and tolyl groups, as well as those substituted monovalent hydrocarbon groups obtained by replacing a part or all of the above named hydrocarbon groups with, for example, halogen atoms, cyano groups and the like exemplified by chloromethyl, 3,3,3-trifluoropropyl and 2-cyanoethyl groups. It is preferable that at least 80% in number of the groups denoted by R in a molecule are methyl groups in respect of the high surface-releasability of the cured film formed from the organopolysiloxane. The symbol A in the formula is a group having at least one (meth)acryloxy group of the formula $H_2C=CR^1-CO-O-$, $R^1$ being a hydrogen atom or a methyl group. The subscript n is a positive integer in the range from 4 to 101. When the value of n is too small, the radiation-cured coating film of the compound only has low surface releasability while, when the value of n is too large, the radiation-curability of the compound is somewhat decreased. Though not particularly limitative, the subscript m in the formula is a positive integer in the range from 1 to 5 in respect of the simple synthetic procedure described later. The subscript a in the formula is zero, 1 or 2 satisfying the requirement that the total number of the (meth)acryloxy groups in the (3-a) groups denoted by the symbol A is at least three. For example, the value of a must be zero when each of the groups denoted by A has only one (meth)acryloxy group.

Following are the examples of the structural formulas expressing the organopolysiloxane compounds represented by the general formula (1) and in conformity with the definitions of each of the symbols and subscripts:

$R_3Si-O-(-SiR_2-O-)_n-SiR_2-(CH_2-)_2-Si(O-Si-C_3H_6-Q)_3$;

$R_3Si-O-(-SiR_2-O-)_n-SiR_2-(CH_2-)_2-Si(O-Si-CH_2-Q)_3$;

$R_3Si-O-(-SiR_2-O-)_n-SiR_2-(CH_2)_2-SiR-[O-CH(CH_2-Q)_2]_2$;

$R_3Si-O-(-SiR_2-O-)_n-SiR_2-(CH_2)_2-SiR-[O-CH_2-C(CH_2-Q)_3]_2$;

$R_3Si-O-(-SiR_2-O-)_n-SiR_2-(CH_2-)_2-Si[O-CH(CH_2-Q)_2]_3$; and $R_3Si-O-(-SiR_2-O-)_n-SiR_2-(CH_2-)_2-Si[O-CH_2-C(CH_2-Q)_3]_3$;

in which each of the groups denoted by Q in a molecule can be, independently from the others, an acryloxy group or a methacryloxy group.

Following is a description of the synthetic procedure for the preparation of the inventive organopolysiloxane compound represented by the general formula (1). In the first place, a hexaorgano cyclotrisiloxane, e.g., hexamethyl cyclotrisiloxane, is subjected to a ring-opening polymerization reaction with a triorganosilanol, e.g., trimethyl silanol, as the chain-stopper agent in the presence of a penta-coordinate organosilicon compound such as the compound expressed by the following formula

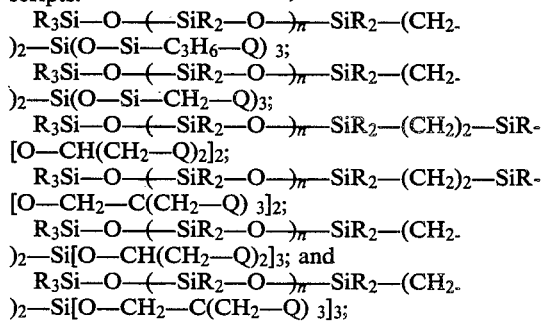

as a catalyst so as to give a linear diorganopolysiloxane blocked at only one of the molecular chain ends with a silanolic hydroxy group and represented by the general formula $R_3Si-O-(-SiR_2-O-)_{n-1}-SiR_2-OH$,  (II)

in which R and n each have the same meaning as defined above.

The second step is the dehydrochlorination reaction of the above obtained one-end OH-blocked diorganopolysiloxane of the general formula (II) with a diorganochlorosilane, e.g., dimethyl chlorosilane, of the general formula $R_2HSiCl$, R being the same as above, in the presence of an acid acceptor such as triethyl amine to give an SiH-terminated diorganopolysiloxane represented by the general formula $R_3Si-O-(-SiR_2-O-)_n-SiR_2-H$.  (III)

The next step is the addition reaction or the so called hydrosilation reaction between the above obtained one end SiH-terminated diorganopolysiloxane of the general formula (III) and an alkenyl containing or, preferably, a vinyl group-containing organosilane compound represented by the general formula $CH_2=CH-(CH_2)_{m-2}Si(R)_a(X)_{3-a}$,  (IV)

in which R, m and a each have the same meaning as defined above, m being preferably equal to 2, and X is a halogen or, preferably, chlorine atom or an alkoxy group, e.g., methoxy and ethoxy groups, in the presence of a platinum compound as the catalyst to give a one-end SiX terminated diorganopolysiloxane represented by the general formula $R_3Si-O-(-SiR_2-O-)_n-SiR_2-(CH_2)_mSi(R)_a(X)_{3-a}$.  (IV)

The last step of the synthetic process to give the organopolysiloxane of the general formula (I) is the dehydrohalogenation reaction, when X is a halogen atom, or dealcoholation condensation reaction, when X is an alkoxy group, with a compound having at least one (meth)acryloxy group and one hydroxy group simultaneously in a molecule in the presence of a suitable acceptor for the hydrogen halide or catalyst for the dealcoholation reaction. Examples of such a (meth)acryloxy- and hydroxy-containing compound include those expressed by the following structural formulas, in which the symbol Me is a methyl group:

Q—$C_3H_6$—$SiMe_2$—OH;

Q—$CH_2$—$SiMe_2$—OH;

Q—$CH_2$—CH(OH)—$CH_2$—Q; and

HO—$CH_2$—C($CH_2$—Q)$_3$, in which each of the groups denoted by Q in a moleculae can be, independently from the others when a molecule has two or more of the groups Q, an acryloxy group or a methacryloxy group. Needless to say, the type of the (meth)acryloxy- and hydroxy-containing compound must be selected in consideration of the value of the subscript a in the general formula (IV) in order to satisfy the requirement that the resulting organopolysiloxane of the general formula (I) should have at least three (meth)acryloxy groups.

As is mentioned before, the inventive organopolysiloxane compound of the general formula (I) obtained in the above described manner has excellent radiation-curability with a relatively small dose of electron beams to give a cured surface film having excellent surface releasability against adhesives or sticky substances so that the compound as such can be used as a surface releasing agent for the back surface of pressure-sensitive adhesive tapes or a surface-releasing agent of release paper on pressure-sensitive adhesive labels or stickers for temporary protection. The inventive compound can be easily cured by the irradiation with a radiation such as electron beams, γ-rays and X-rays as well as ultraviolet light. When the radiation is ultraviolet light, in particular, it is desirable that the inventive organopolysiloxane compound is admixed with a photopolymerization initiator such as acetophenone, benzophenone, 4-chlorobenzophenone, 4,4 -dimethoxy benzophenone, 4-methyl acetophenone, benzoin methyl ether, benzoin trialkylsilyl ethers and the like. The amount of the photopolymerization initiator is preferably in the range from 0.5 to 15% by weight based on the organopolysiloxane of the general formula (I).

The organopolysiloxane of the present invention can be used as such as a radiation-curable surface releasing agent to be applied to the substrate surface. It is optional according to need that the surface-releasing agent is prepared by admixing the inventive organopolysiloxane with various kinds of additives such as levelling agents, antistatic agents, defoaming agents, coloring agents and the like. If necessary to facilitate the coating work with the surface-releasing agent, it can optionally be diluted with a suitable organic solvent. The surface-releasing agent of the inventive organopolysiloxane is applicable to the surface of any substrate materials such as paper, plastic films, metal foils and the like. The thickness of coating is usually in the range from 0.1 to 200 μm but naturally depends on the sticking power of the adhesive or sticky substance against which the surface-releasing treatment is undertaken. The coating machine used in the coating work is not particularly limitative including bar coaters, gravure coaters, reverse coaters, rod coaters, offset printing machines and the like. The thus formed coating film of the inventive organopolysiloxane can be readily cured to exhibit excellent surface releasability by the irradiation with a radiation such as electron beams and ultraviolet light. When electron beams are used as the radiation, complete cure of the organopolysiloxane can be achieved with a dose of, for example, 0.3 Mrad or larger.

. In the following, the invention is described in more detail by way of examples including a description of the typical process for the preparation of the organopolysiloxane and application thereof as a surface-releasing agent making a comparison with conventional organopolysiloxanes. In the following description, the term of "parts" always refers to "parts by weight" and the values of viscosity are all those obtained by the measurement at 25° C. The effectiveness of the surface releasing treatment with the organopolysiloxanes was evaluated in terms of the peeling resistance and the residual adhesiveness determined by the following procedures.

Peeling resistance

A specified pressure-sensitive adhesive tape (Lumirar 31B Tape, a product by Nitto Denko Co., Japan) was applied and bonded to the surface of a substrate after the surface-releasing treatment and kept for 72 hours at 70° C. under a load of 20 g/cm³ and the adhesive tape was then peeled off at 25° C. by pulling in the 180° direction using an automatic tensile tester at a pulling velocity of 30 cm/minute to record the resistance against peeling in g per 5 cm width of the tape.

Residual adhesiveness

The value of the residual adhesiveness was given as a % ratio of the value of peeling resistance determined by peeling an adhesive tape, which was taken by peeling off from the release-treated substrate surface in the above described peeling resistance test and then applied and bonded to a well-polished clean stainless steel plate, off the stainless steel plate to the value of peeling resistance determined in just the same manner as above excepting replacement of the release-treated substrate with a clean Teflon plate. A larger value of this residual adhesiveness means a smaller fraction of uncured organopolysiloxane in the surface-releasing coating film which may migrate from the release-treated substrate surface to the pressure-sensitive adhesive tape to decrease the adhesiveness of the tape. In other words, the value of residual adhesiveness can be used as a measure of the curability of the organopolysiloxane.

Synthetic Preparation 1

Into a four-necked glass flask of 1 liter capacity were introduced 666 g (3 moles) of hexamethyl cyclotrisiloxane, 90 g (1 mole) of trimethyl silanol and 0.1 g of a pentacoordinate organosilicon compound expressed by the formula

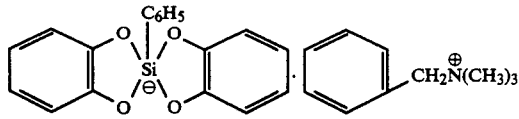

as a catalyst to form a reaction mixture, which was heated at 80° C. for 16 hours under agitation to effect the ring-opening polymerization reaction of the cyclic trisiloxane. The product was a one-end silanol terminated dimethyl polysiloxane having an average degree of polymerization of 10 and expressed by the formula

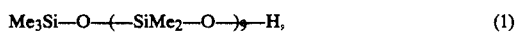 (1)

in which Me is a methyl group.

In the next place, the thus obtained one-end silanol-terminated dimethyl polysiloxane was admixed with 120 g of triethyl amine and then 94.5 g (1.0 mole) of dimethyl monochlorosilane were added dropwise to the mixture in the flask, which was agitated for 5 hours at 25° C. The product was a one-end SiH-terminated dimethyl polysiloxane having an average degree of polymerization of 11 expressed by the formula

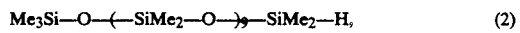 (2)

in which Me is a methyl group.

Then, 162.8 g (0.2 mole) of the one-end SiH-terminated dimethyl polysiloxane of the formula (2), 32.3 g (0.2 mole) of vinyl trichlorosilane, 200 g of toluene and 0.1 g of a 2% solution of chloroplatinic acid in n butyl alcohol were introduced into a four-necked flask of 500 ml capacity and the mixture was heated at 100° C. for 5 hours under agitation to effect the hydrosilation reaction. The reaction mixture was examined by the infrared absorption spectrophotometry which indicated complete disappearance of the absorption band at the wave number of 2150 cm $^{-1}$ assignable to the Si-H bond. The product was a dimethyl polysiloxane blocked at one molecular chain end with a trichlorosilylethyl group and expressed by the formula

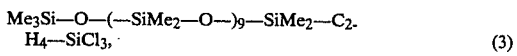
(3)

in which Me is a methyl group.

In the last step of the synthetic procedure, 97.6 g (0.1 mole) of the above obtained one end trichlorosilylethyl-terminated dimethyl polysiloxane of the formula (3), 89.4 g (0.3 mole) of pentaerithritol triacrylate, 187 g of toluene, 88.2 g of triethyl amine and 0.08 g of di-tertbutyl hydroxytoluene were introduced into a four-necked flask of 500 ml capacity and the mixture was heated at 70° C. for 3 hours under agitation to effect the dehydrochlorination reaction. The precipitates of triethylamine hydrochloride were removed from the reaction mixture by filtration and the filtrate was stripped of the volatile matter including the solvent by heating under reduced pressure to give 140 g of a clear, light yellow liquid product having a viscosity of 120 centipoise. This product, referred to as the polysiloxane A hereinbelow, could be assumed to be expressed by the formula

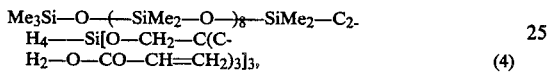
(4)

having nine acryloxy groups localized at one molecular chain end.

Synthetic Preparation 2

The synthetic procedure was substantially the same as in Synthetic Preparation 1 described above excepting replacement of the pentaerithritol triacrylate with the same molar amount, i.e. 64.2 g, of glycerin 1-methacrylate 3-acrylate of the formula $$CH_2=CMe-CO-O-CH_2-CH(OH)-CH_2-O-CO-CH=CH_2$$

to give 128 g of a clear, light yellow liquid product having a viscosity of 85 centipoise. This product, referred to as the polysiloxane B hereinbelow, could be assumed to be expressed by the formula

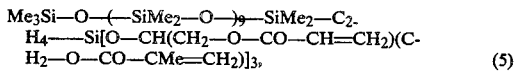
(5)

having three acryloxy and three methacryloxy groups localized at one molecular chain end.

Synthetic preparation 3

A one-end SiH-terminated dimethyl polysiloxane expressed by the formula

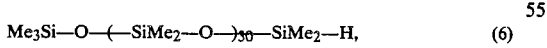
(6)

was prepared in substantially the same manner as in the preparation of the dimethyl polysiloxane of the formula (2) in Synthetic Preparation 1 excepting modification of the proportion of the hexamethyl cyclotrisiloxane and trimethyl silanol. Then, 236.8 g (0.1 mole) of this dimethyl polysiloxane and 16.2 g (0.1 mole) of vinyl trichlorosilane were subjected to the hydrosilation reaction in the same manner as in the preparation of the dimethyl polysiloxane of the formula (3) to give a one-end trichlorosilyl ethyl-terminated dimethyl polysiloxane expressed by the formula

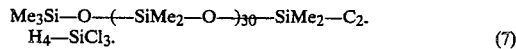
(7)

In the last step, 253 g (0.1 mole) of the thus obtained dimethyl polysiloxane of the formula (7) and 89.4 g (0.3 mole) of pentaerithritol triacrylate were subjected to the dehydrochlorination reaction with triethyl amine as the acid acceptor in the same manner as in Synthetic Preparation 1 to give 250 g of a clear, light yellow liquid product having a viscosity of 90 centipoise. This product, referred to as the polysiloxane C hereinbelow, could be assumed to be expressed by the formula

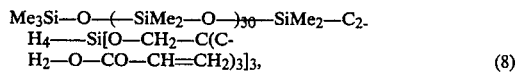
(8)

having nine acryloxy groups localized at one molecular chain end.

Synthetic Preparation 4

A one-end SiH terminated dimethyl polysiloxane expressed by the formula

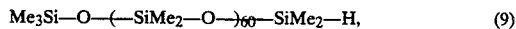
(9)

was prepared in substantially the same manner as in the preparation of the dimethyl polysiloxane of the formula (2) in Synthetic Preparation 1 excepting modification of the proportion of the hexamethyl cyclotrisiloxane and trimethyl silanol. Then, 229.4 g (0.05 mole) of this dimethyl polysiloxane and 7.1 g (0.05 mole) of vinyl methyl dichlorosilane were subjected to the hydrosilation reaction in the same manner as in the preparation of the dimethyl polysiloxane of the formula (3) to give a one-end methyldichlorosilyl ethyl-terminated dimethyl polysiloxane expressed by the formula

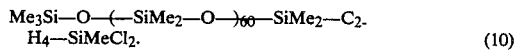
(10)

In the last step, 236.5 g (0.05 mole) of the thus obtained dimethyl polysiloxane of the formula (10) and 21.4 g (0.1 mole) of glycerin 1-methacrylate 3-acrylate were subjected to the dehydrochlorination reaction with triethyl amine as the acid acceptor in the same manner as in Synthetic Preparation 1 to give 205 g of a clear, light yellow liquid product having a viscosity of 120 centipoise. This product, referred to as the polysiloxane D hereinbelow, could be assumed to be expressed by the formula

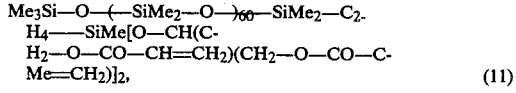
(11)

having two acryloxy and two methacryloxy groups localized at one molecular chain end.

Synthetic Preparation 5 (Comparative)

A hydrosilation reaction was conducted in substantially the same manner as in Synthetic Example 1 between 236.8 g (0.1 mole) of the one end SiH-terminated dimethyl polysiloxane prepared in Synthetic Preparation 3 and expressed by the formula (6) and 12.05 g (0.1 mole) of dimethyl vinyl chlorosilane to give a one end dimethylchlorosilyl ethyl-terminated dimethyl polysiloxane expressed by the formula

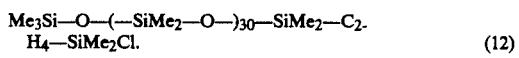

$$Me_3Si-O-(-SiMe_2-O-)_{30}-SiMe_2-C_2H_4-SiMe_2Cl. \quad (12)$$

Then, 124 g (0.05 mole) of this dimethyl polysiloxane and 10.7 g (0.05 mole) of glycerin 1-methacrylate 3-acrylate were subjected to the dehydrochlorination reaction in the same manner as in Synthetic Preparation 2 to give 98 g of a clear, light yellow product having a viscosity of 80 centipoise. This product, referred to as the polysiloxane E hereinbelow, could be assumed to be expressed by the formula

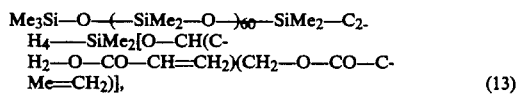

$$Me_3Si-O-(-SiMe_2-O-)_{60}-SiMe_2-C_2H_4-SiMe_2[O-CH(CH_2-O-CO-CH=CH_2)(CH_2-O-CO-CMe=CH_2)], \quad (13)$$

having each one of acryloxy and methacryloxy groups localized at one molecular chain end.

APPLICATION EXAMPLE 1

A sheet of polyethylene-laminated paper was coated on the polyethylene surface with the polysiloxane A obtained in Synthetic Preparation 1 in a coating amount of 0.8 g/m² using an offset printing machine and the coating film was irradiated with electron beams in a dose of 0.5 Mrad in an atmosphere of nitrogen gas using a low energy electron accelerator (Electrocurtain Model CB20d 50/30, a product by Energy Science Industry Co.) to find that the coating film was completely cured to firmly adhere to the substrate surface.

The thus formed cured coating film on the substrate surface was subjected to the tests of the peeling resistance and residual adhesiveness in the testing procedures described before using a pressure sensitive adhesive tape Lumirar 31B (a product by Nitto Denko Co.) to find that the peeling resistance was 28 g/5 cm and the residual adhesiveness was 100%.

APPLICATION EXAMPLE 2

The experimental procedure was substantially the same as in Application Example 1 described above except that the polysiloxane A was admixed with 4% by weight of benzoin isobutyl ether as a photopolymerization initiator and the coating film on the substrate surface in a coating amount of about 2.0 g/m² was irradiated, instead of the electron beam irradiation, in air for about 0.6 second with ultraviolet light using two high-pressure mercury lamps each having a linear output of 80 watts/cm and held at a distance of 8 cm above the substrate surface. The thus formed completely cured coating film on the substrate surface was subjected to the same tests as above to find that the peeling resistance was 20 g/5 cm and the residual adhesiveness was 95%.

APPLICATION EXAMPLE 3

The experimental procedure was just the same as in Application Example 1 excepting replacement of the polysiloxane A with the polysiloxane B prepared in Synthetic Preparation 2. The coating film could also be completely cured and the tests undertaken with the thus cured coating film gave results of a peeling resistance of 30 g/5 cm and a residual adhesiveness of 100%.

APPLICATION EXAMPLES 4 AND 5

The experimental procedure in each of the experiments was just the same as in Application Example 1 excepting replacement of the polysiloxane A with the polysiloxane C prepared in Synthetic Preparation 3 and the polysiloxane D prepared in Synthetic preparation 4, respectively, to find that the dose of the electron beam irradiation required for complete curing of the coating films was 3 Mrad and 5 Mrad for the polysiloxanes C and D, respectively. The peeling resistance and residual adhesiveness were 12 g/5 cm and 98% for the polysiloxane C and 5 g/5 cm and 90% for the polysiloxane D.

APPLICATION EXAMPLE 6 (COMPARATIVE)

The same experimental procedure as in Application Example 1 was undertaken excepting replacement of the polysiloxane A with the polysiloxane E prepared in Synthetic Preparation 5 to find that the coating film could not be cured even by increasing the dose of the electron beam irradiation up to 8 Mrad indicating that this polysiloxane E could not be used practically as an electron beam-curable coating agent.

What is claimed is:

1. An organopolysiloxane compound represented by the general formula

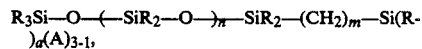

$$R_3Si-O-(-SiR_2-O-)_n-SiR_2-(CH_2)_m-Si(R-)_a(A)_{3-1},$$

in which each R is, independently from the others, a monovalent hydrocarbon group, A is a group having at least one (meth)acryloxy group of the formula $H_2C=CR^1-CO-O-$, $R^1$ being a hydrogen atom or a methyl group, the subscript n is a positive integer in the range from 4 to 101, the subscript m is a positive integer in the range from 1 to 5 and the subscript a is zero, 1 or 2, the total number of the (meth)acryloxy groups in the group or groups denoted by A being at least three.

2. The organopolysiloxane compound as claimed in claim 1 wherein the group denoted by R is a methyl group.

3. The organopolysiloxane compound as claimed in claim 1 wherein the subscript m is 2.

4. The organopolysiloxane compound as claimed in claim 1 wherein the group denoted by A is a tris(acryloxymethyl)methoxy group of the formula $-O-CH_2-C(CH_2-O-CO-CH=CH_2)_3$ or a methacryloxymethyl acryloxymethyl methoxy group of the formula $-O-CH(CH_2-O-CO-CCH_3=CH_2)(CH_2-O-CO-CH=CH_2)$.

5. A method for the preparation of an organopolysiloxane compound according to claim 1 which comprises the steps of:

(a) subjecting a hexaorgano cyclotrisiloxane to a ring-opening polymerization reaction with a triorganosilanol as a chain end-stopper agent in the presence of a penta coordinate organosilicon compound as a catalyst to form a diorganopolysiloxane having a linear molecular structure and terminated at only one of the molecular chain ends with a silanolic hydroxy group, the other terminal group being a triorganosilyl group;

(b) subjecting the one end silanol-terminated diorganopolysiloxane obtained in step (a) to a dehydrochlorination reaction with a diorganochlorosilane in the presence of an acid acceptor to form a diorganopolysiloxane terminated at only one of the molecular chain ends with a hydrogen atom directly bonded to the terminal silicon atom;

(c) subjecting the one-end SiH terminated diorganopolysiloxane obtained in step (b) to a hydrosilation reaction with an alkenyl silane compound represented by the general formula $$CH_2=CH-(CH_2)_{m-2}Si(R)_a(X)_{3-a},$$

in which R, M and a each have the same meaning as defined in claim 1 and X is a chlorine atom or an alkoxy group, in the presence of a platinum compound as a catalyst to form a diorganopolysiloxane terminated at only one of the molecular chain ends with the group of the formula $-CH_2-CH_2-(CH_2)_{m-2}Si(R)_a(X)_{3-a}$; and (d) subjecting the diorganopolysiloxane obtained in step (c) to a dehydrochlorination reaction or dealcoholation condensation reaction with a compound having a hydroxy group and at least one (meth)acryloxy group in a molecule in the presence of an acid acceptor or a catalyst for the dealcoholation condensation reaction.

6. The method for the preparation of an organopolysiloxane compound according to claim 1 as claimed in claim 5 wherein the compound having a hydroxy group and at least one (meth)acryloxy group in a molecule is pentaerithritol triacrylate or glycerin 1 methacrylate-3 acrylate.

7. A method for forming a cured coating film on a substrate surface having releasability against sticky substances which comprises:
   (i) coating the substrate surface with the organopolysiloxane compound according to claim 1; and
   (ii) irradiating the substrate surface coated with the organopolysiloxane compound with a radiation.

8. The method for forming a cured coating film on a substrate surface having releasability against sticky substances as claimed in claim 7 wherein the irradiation in step (ii) is performed with electron beams.

9. The method for forming a cured coating film on a substrate surface having releasability against sticky substances as claimed in claim 7 wherein the organopolysiloxane compound is admixed with a photopolymerization initiator and the irradiation in step (ii) is performed with ultraviolet light.

* * * * *